(12) United States Patent
Virgen

(10) Patent No.: US 9,174,799 B2
(45) Date of Patent: Nov. 3, 2015

(54) BEVERAGE CONTAINER HOLDER

(71) Applicant: Ford Global Technologies, LLC, Dearborn, MI (US)

(72) Inventor: Esteban Virgen, Monterrey (MX)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 173 days.

(21) Appl. No.: 13/973,172

(22) Filed: Aug. 22, 2013

(65) Prior Publication Data
US 2015/0053834 A1    Feb. 26, 2015

(51) Int. Cl.
*B60N 3/10* (2006.01)
*B65D 90/12* (2006.01)
*B29C 45/00* (2006.01)
*B29L 31/00* (2006.01)

(52) U.S. Cl.
CPC ............ *B65D 90/12* (2013.01); *B29C 45/0001* (2013.01); *B60N 3/108* (2013.01); *B29K 2023/06* (2013.01); *B29K 2223/06* (2013.01); *B29K 2423/06* (2013.01); *B29K 2623/06* (2013.01); *B29K 2823/06* (2013.01); *B29L 2031/00* (2013.01)

(58) Field of Classification Search
CPC ........ B60N 3/106; B60N 3/108; B60N 3/101; B60N 2/4613
USPC ....................................................... 248/311.2
See application file for complete search history.

(56) References Cited

U.S. PATENT DOCUMENTS

| | | | | |
|---|---|---|---|---|
| 5,655,742 | A | * | 8/1997 | Whitman et al. .......... 248/311.2 |
| 7,413,154 | B2 | * | 8/2008 | Harshman et al. ......... 248/311.2 |
| 8,113,477 | B2 | | 2/2012 | Kaemmer |
| 8,360,380 | B2 | * | 1/2013 | Soma et al. ................ 248/311.2 |
| 8,622,580 | B2 | * | 1/2014 | Lim et al. ...................... 362/267 |
| 8,733,724 | B2 | * | 5/2014 | Voigt et al. ................ 248/311.2 |
| 2004/0021048 | A1 | * | 2/2004 | Schaal .......................... 248/310 |
| 2011/0025105 | A1 | | 2/2011 | Henke et al. |

FOREIGN PATENT DOCUMENTS

DE    202005010253 U1    9/2005
DE    102005019485 A1    11/2006

* cited by examiner

*Primary Examiner* — Jeanette E Chapman
*Assistant Examiner* — Daniel Kenny
(74) *Attorney, Agent, or Firm* — Vichit Chea; Brooks Kushman P.C.

(57) ABSTRACT

A beverage container holder having a receptacle, gripping members, and a membrane is disclosed. The membrane is disposed in openings located between a sidewall of the receptacle and the gripping members. Living hinges are integrated into the gripping members, which allow the gripping members to flex and provide a gripping force on a beverage container that has been placed into the beverage container holder in order to provide a more stable and secure placement of the container. The receptacle and gripping members are manufactured in one step process, preferably an injection molding process, and are composed of a material having a low coefficient of friction, preferably a hard plastic, which allows for the easy placement or retrieval of a beverage container. The membrane is overmolded onto the receptacle and gripping members and is preferably composed of a flexible material such as a soft plastic or rubber.

15 Claims, 4 Drawing Sheets

BEVERAGE CONTAINER HOLDER

TECHNICAL FIELD

This invention relates to beverage container holders that are typically found in automobiles.

BACKGROUND

Beverage container holders provide a secure location to place a beverage container when an individual needs to free up both hands for some other reason or if the individual just wishes to relax from holding the beverage container. One prime example would include the operator of an automobile placing a beverage container into a beverage container holder in order to free up both hands in order to properly operate an automobile. Beverage container holders typically have a receptacle that consists of a base with a flat top surface for a beverage container to rest on, a sidewall extending from the base that at least partially surrounds the beverage container and prevents the container from tipping over, and an open top portion that allows for the easy placement in or retrieval from the beverage container holder of the beverage container.

Some beverage container holders also include flexible gripping members that protrude toward the interior of the sidewall when there is no container in the beverage container holder. When a beverage container is placed into the beverage container holder, the gripping members will flex away from the interior of the sidewall and provide a gripping force on the beverage container to provide a more stable and secure placement of the container.

Various efforts have been made to include gripping members that provide additional gripping forces to provide a more stable and secure placement of a beverage container in a beverage container holder.

It is known to manufacture the gripping members and other components of the beverage container holder in separate processes. This configuration presents design difficulties which require the packaging of several individual components into the final product. Also, this configuration will require additional time and expense to produce, because the individual components are manufactured separately and assembly of the components is required to obtain the final product.

It is also known to manufacture a beverage container holder having gripping members from a two-step molding process, where the gripping members are made from a soft material, such as a soft plastic or rubber that is overmolded onto the remaining portion of the beverage container holder. Since the beverage container holder is manufactured from a two-step molding process, this configuration eliminates the packaging difficulties presented in the design process and the requirement that individual components be assembled into a final product. This configuration however, may result in unwanted efforts or complications to insert or remove the beverage container because of the high coefficient of friction typical of soft plastic or rubber.

It would be desirable to provide a beverage container holder that is manufactured from a two-step molding process to eliminate the individual manufacturing of components, the need to assemble the individual components into the final product, and the packaging difficulties presented in the design process, while at the same time providing a gripping member that is composed of a material having a low coefficient of friction which allows a beverage container to be easily inserted or removed from the beverage container holder.

SUMMARY

In a first illustrative embodiment, a beverage container holder is provided having a receptacle for receiving a beverage container. The receptacle has a base, a sidewall extending upward from the base, and at least one opening in the sidewall of the receptacle. At least one gripping member extends from the base of the receptacle into at least one opening of the sidewall of the receptacle. The gripping member has a connecting portion, a contact portion, and a living hinge that is located between the contact portion and the connecting portion. The connecting portion connects the gripping member to the base of the receptacle. An elastic membrane having a rigidity that is lower than the receptacle and the gripping member is disposed in at least one opening of the receptacle and connects the sidewall of the receptacle to the gripping member. The membrane is made from a flexible material, preferably a soft plastic or rubber such as thermoplastic elastic olefin. The membrane may also form a layer on the top surface of the base of the receptacle.

The living hinge of the first embodiment biases the gripping member toward the interior of the sidewall when a beverage container is placed into the receptacle. The contact portion of the gripping member contacts and applies a force to the beverage container to properly secure the container in the receptacle. The gripping member is made from material having a relatively low coefficient of friction, preferably a hard plastic such as thermoplastic polyolefin, so that the gripping member exerts a relatively low amount of "drag" on the beverage container as it is inserted into or removed from the beverage container holder. Contact between elastic membrane and the beverage container is avoided because materials having good elastic qualities (soft plastics and rubbers, such as thermoplastic elastic olefin) typically have a high coefficient of friction which may result in unwanted drag on the beverage container during insertion/removal.

In a second illustrative embodiment, a beverage container holder is provided having a receptacle for receiving a beverage container. The receptacle has a base with a top surface, a sidewall that extends from the top surface of the base, and at least one opening in the sidewall of the receptacle. At least one gripping member extends from the base of the receptacle into the at least one opening of the sidewall of the receptacle. The gripping member has a connecting portion, a contact portion, and a living hinge that is located between the contact portion and the connecting portion. The connecting portion of the gripping member connects the gripping member to the base of the receptacle.

The living hinge of the second embodiment biases the gripping member toward the interior of the sidewall when a beverage container is placed into the receptacle. The contact portion of the gripping member contacts and applies a force to the beverage container to properly secure the container in the receptacle. The gripping member is made from material having a low coefficient of friction, preferably a hard plastic such as thermoplastic polyolefin, so the beverage container can be easily inserted or removed from the beverage container holder.

In another embodiment, a method for producing the beverage container holder of the first or second embodiment is disclosed where the receptacle, at least one gripping member, and the membrane are formed, preferably from an injection molding process. It is further preferred that the receptacle and the at least one gripping member are formed in a single first step from an injection molding process and the membrane is overmolded onto the receptacle and at least one gripping member in a second step.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
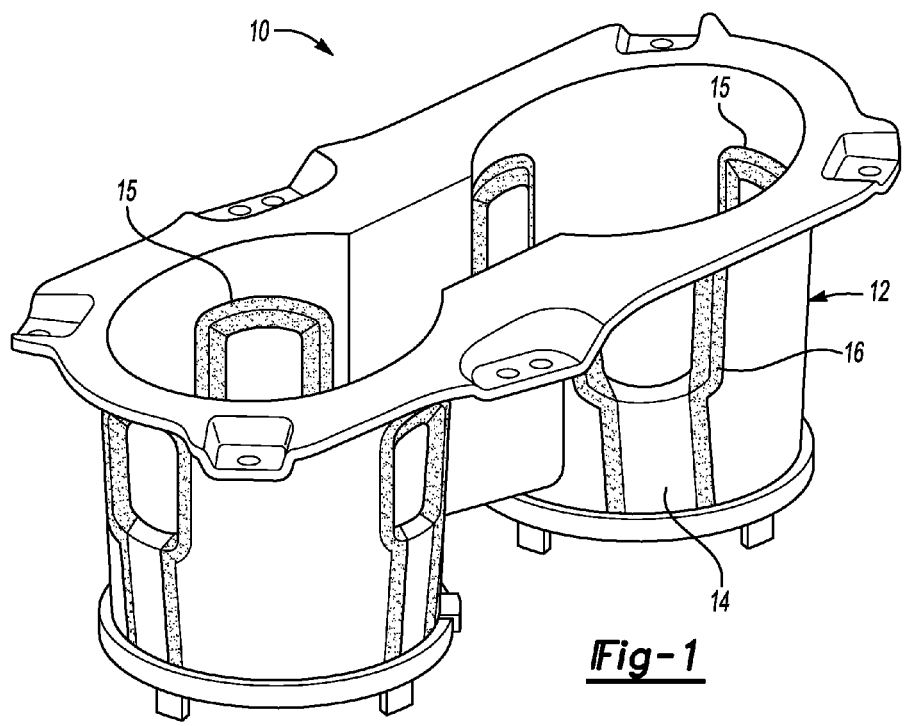
FIG. 1 is an isometric view of the beverage container holder.

An isometric view of an embodiment of the beverage container holder 10 according to the present disclosure is illustrated in FIG. 1. The disclosed embodiment of the beverage container holder 10 consists of two receptacles 12, each receptacle having three gripping members 14. Although the beverage container holder 10 shows two receptacles 12, each receptacle having three gripping members 14, the disclosure should not be limited to this specific configuration, but more generally includes beverage container holders that have one or more receptacles, each receptacle having one or more gripping members.

Figure 2:
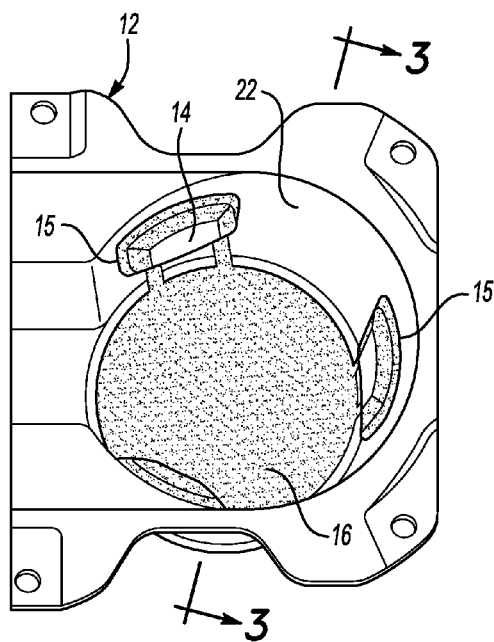
FIG. 2 is a partial plan view of the beverage container holder in FIG. 1.
Figure 3:
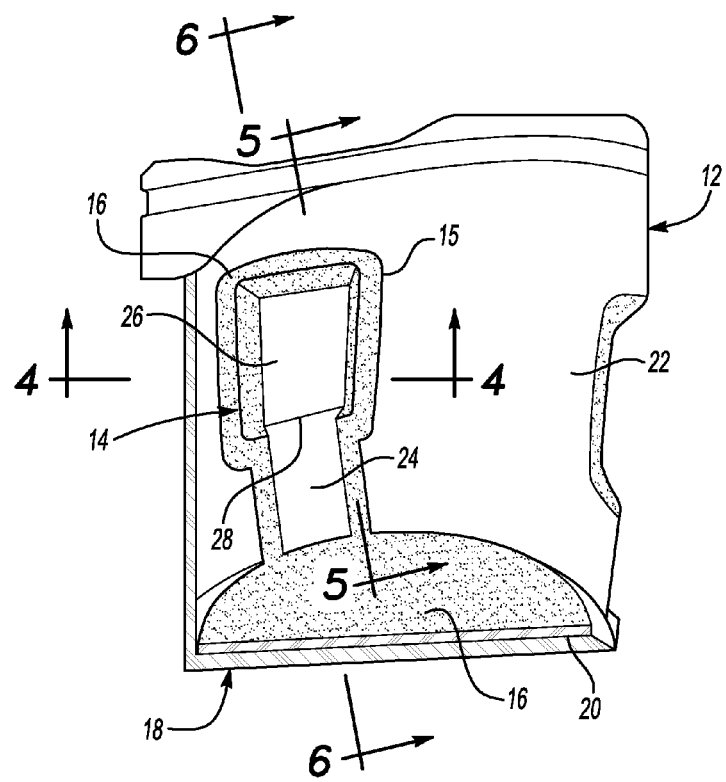
FIG. 3 is a cross-sectional view taken along the line 3-3 of FIG. 2.

Referring to FIGS. 2 and 3, the receptacle 12 has a base 18 with a top surface 20 and a sidewall 22 that extends upwardly from the base 18. The sidewall 22 of the receptacle 12 defines at least one opening 15 in which a gripping member 14 is located. Each gripping member 14 extends upwardly from the base 18 and into the opening 15 in the sidewall 22 of the receptacle 12. At the lower end of each gripping member 14, a connecting portion 24 attaches the gripping member 14 to the base 18. At the upper end of each gripping member 14, a contact portion 26 is provided. The contact portion 26 is joined to the connecting portion 24 by a living hinge 28. Portions of the gripping members 14 above the base 18 are separated from the sidewall 22 by the remaining space in the openings 15.

A living hinge 28 is a thin flexible hinge made from the same material as the two rigid pieces that it connects. Typically, a living hinge 28 is a cut or thinned portion between two rigid pieces that allows the rigid pieces to bend along the line of the hinge.

Still referring to FIGS. 2 and 3, an elastic membrane 16 is disposed in the remaining space in the openings 15 between the receptacle 12 and gripping members 14.

Figure 4:
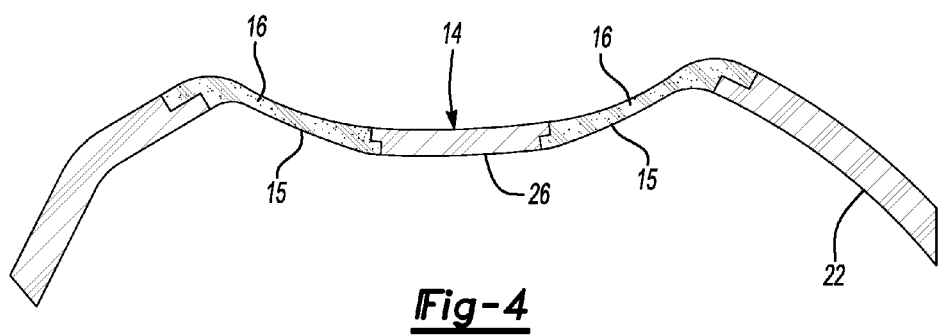
FIG. 4 is a horizontal cross-sectional view taken along the line 4-4 in FIG. 3.

FIG. 4 is a horizontal cross-sectional view taken along the line 4-4 in FIG. 3, showing the elastic membrane 16 occupying the vertically extending portions of the opening 15 between the sidewall 22 and the contact portion 26 of the gripping member 14, the elastic membrane 16 joining the gripping member 14 to the sidewall 22.

Figure 5:
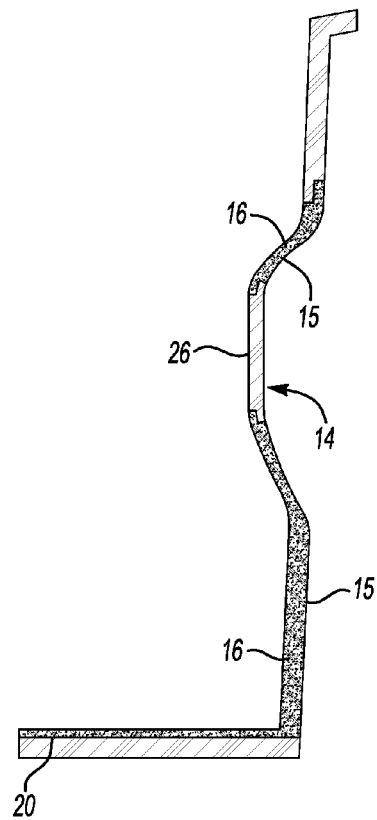
FIG. 5 is a vertical cross-sectional view taken along the line 5-5 in FIG. 3.

FIG. 5 is a vertical cross-sectional view taken along the line 5-5 in FIG. 3, showing the elastic membrane 16 disposed in the vertical portion of the opening 15 between the sidewall 22 and connecting portion 24 of the gripping member 14, as well as the horizontal portion of the opening 15 between the contact portion 26 of the gripping member 14 and the sidewall 22.

Figure 6:
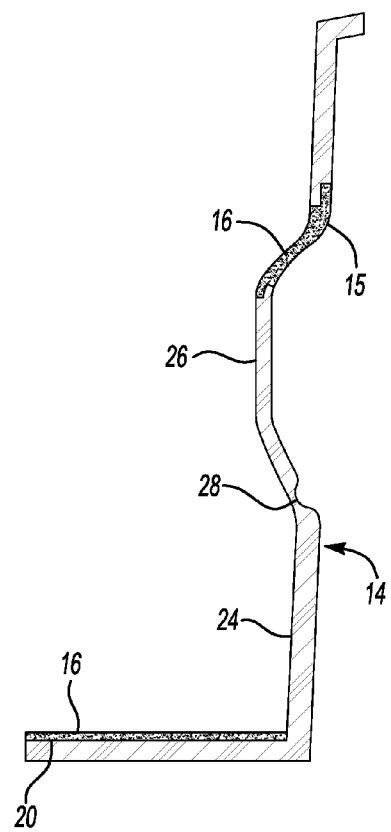
FIG. 6 is a vertical cross-sectional view taken along the line 6-6 in FIG. 3.

FIG. 6 is a vertical cross-sectional view taken along the line 6-6 in FIG. 3, showing the contact portion 26 of the gripping member 14 disposed between the connecting portion 24 of the gripping member 14 and the elastic membrane 16, where the living hinge 28 connects the contact portion 26 to the connecting portion 24.

Still referring to FIGS. 5 and 6, the elastic membrane 16 may also form a layer on the top surface 20 of the base 18 of the receptacle to provide traction.

Figure 7:
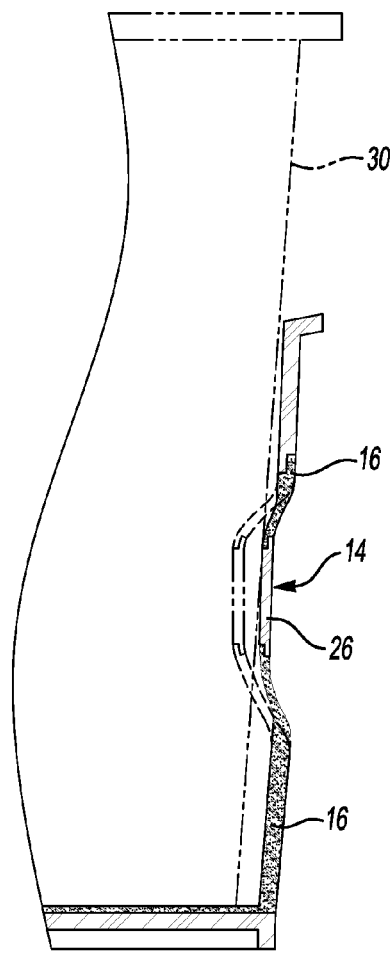
FIG. 7 is a partial cross-sectional view of the beverage container holder, showing the displacement of the cross section of the gripping member in FIG. 5 when a beverage container is inserted into the beverage container holder.

FIG. 7 is a cross-sectional view taken along approximately the same line as FIG. 5, and shows a rest position (show in phantom), which it assumes when no beverage container 30 is present, and an engaged position when a beverage container 30 is present. When inserted into the receptacle 12, the beverage container 30 pushes on the contact portion 26 of the gripping member 14 and urges it to the engaged position. The contact portion 26 and elastic membrane 16 flex toward the exterior of the receptacle 12. In the engaged position, the contact portion 26 of the gripping member 14 contacts the beverage container 30 while the elastic membrane 16 does not contact the beverage container 30. Contact between the elastic membrane 16 and a beverage container 30 is generally to be avoided because such contact may make it difficult to insert or remove the beverage container 30 from the receptacle 12 since the material from which the membrane 16 is formed generally has a higher coefficient of friction than does the material of the contact portion 26.

Figure 8:
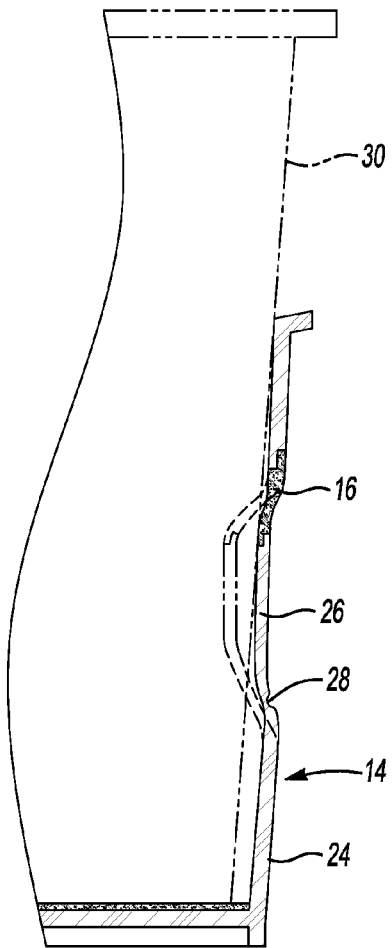
FIG. 8 is a partial cross-sectional view of the beverage container holder, showing the displacement of the cross section of the gripping member in FIG. 6 when a beverage container is inserted into the beverage container holder.

FIG. 8 is a cross-sectional view taken along approximately the same line as FIG. 6, and shows the gripping member 14 in a rest position (shown in phantom), which it assumes when no beverage container 30 is present, and an engaged position when a beverage container 30 is present. When inserted into the receptacle 12, the beverage container 30 pushes on the contact portion 26 of the gripping member 14 and urges it to the engaged position. The contact portion 26 flexes toward the exterior of the receptacle 12 at living hinge 28 that connects the contact portion 26 to the connecting portion 24. The elastic membrane 16 also flexes toward the exterior of the receptacle 12. In the engaged position, the contact portion 26 of the gripping member 14 contacts the beverage container 30 while the elastic membrane 16 does not contact the beverage container 30. The living hinge 28 may act like a spring urging the contact portion 26 inwardly so that it applies a force to the inserted beverage container 30 to properly secure the container in the receptacle 12. Contact between the elastic membrane 16 and a beverage container 30 is generally to be avoided because such contact may make it difficult to insert or remove the beverage container 30 from the receptacle 12 since the material from which the membrane 16 is formed generally has a higher coefficient of friction than does the material of the contact portion 26.

The gripping member 14 may be made from material having a low coefficient of friction, preferably a hard plastic such as thermoplastic polyolefin, so the beverage container 30 can be easily inserted or removed from the beverage container holder 10.

The elastic membrane 16 may be made from a flexible material having a lower rigidity than the gripping member 14, preferably a soft plastic or rubber such as thermoplastic elastic olefin. This allows the elastic membrane 16 to properly flex allowing the gripping member 14 to move outwardly when a beverage container 30 is placed into the beverage container holder 10. The elastic membrane 16 also creates a seal in the beverage container holder 10 which can isolate spills that may occur.

The beverage container holder 10 may be preferably made from a two-step molding process. In the first step, at least one receptacle 12 and at least on gripping member 14 are formed in an injection molding process, preferably as a single component. In the second step, the elastic membrane 16 is overmolded onto the at least one receptacle 12 and at the least on gripping member 14.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A holder for a beverage container comprising:
   a receptacle having a base and a sidewall extending upwardly from the base;
   a gripping member extending upwardly from the base alongside the sidewall and having a connecting portion joined to the base, a contact portion, and a living hinge joining the connecting portion and the contact portion; and
   a membrane connecting at least a portion of the gripping member with the sidewall, the membrane having lower rigidity than the receptacle and gripping member and flexing to permit relative movement therebetween.

2. The holder of claim 1, wherein the living hinge resiliently biases the gripping member toward an interior of the receptacle when the gripping member is urged toward an exterior of the receptacle by insertion of a beverage container into the receptacle.

3. The holder of claim 1, wherein the receptacle and gripping member are made from thermoplastic polyolefin.

4. The holder of claim 1, wherein the membrane is made from a thermoplastic elastic olefin.

5. The holder of claim 1, wherein the membrane also forms a layer on a top surface of the base of the receptacle.

6. The holder of claim 1, wherein the receptacle and the gripping member are formed as a single component.

7. The holder of claim 6, wherein the receptacle and the gripping member are formed by an injection molding process.

8. The holder of claim 1, wherein the membrane is overmolded onto the receptacle and the gripping member.

9. A method for producing a holder for a beverage container comprising:
   forming a receptacle, the receptacle having a base and a sidewall extending from the base and defining an opening;
   forming a gripping member having a connecting portion, a contact portion, and a living hinge joining the connecting portion and the contact portion, the gripping member attached to the base of the receptacle by the connecting portion and extending into the opening; and
   forming a membrane disposed in the opening and connecting the sidewall of the receptacle to the gripping member, the membrane having lower rigidity than the receptacle and gripping member.

10. The method of claim 9, wherein the receptacle and the gripping member are formed in a single step.

11. The method of claim 10, wherein the receptacle and the gripping member are formed by an injection molding process.

12. The method of claim 11, wherein the receptacle and gripping member is made from thermoplastic polyolefin.

13. The method of claim 10, wherein the membrane is overmolded onto the receptacle and gripping member.

14. The method of claim 13, wherein the membrane is made from thermoplastic elastic olefin.

15. A beverage container holder comprising:
   a receptacle having a base and a sidewall extending form the base;
   a grip extending from the base alongside the sidewall and having a connecting portion joined to the base, a contact portion, and a living hinge joining the connecting and contact portions; and
   a membrane connecting a portion of the grip with the sidewall, having lower rigidity than the receptacle and grip, and flexing to permit relative movement therebetween.

* * * * *